US011425735B2

(12) United States Patent
Gupta et al.

(10) Patent No.: US 11,425,735 B2
(45) Date of Patent: Aug. 23, 2022

(54) SCHEDULING CHANNEL STATE INFORMATION (CSI) PROCESSES IN ASSOCIATION WITH PERIODIC TRAFFIC IN A COMP NETWORK

(71) Applicant: QUALCOMM Incorporated, San Diego, CA (US)

(72) Inventors: Piyush Gupta, Bridgewater, NJ (US); Junyi Li, Chester, NJ (US); Chong Li, Weehawken, NJ (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 16/295,779

(22) Filed: Mar. 7, 2019

(65) Prior Publication Data

US 2019/0313423 A1   Oct. 10, 2019

Related U.S. Application Data

(60) Provisional application No. 62/653,470, filed on Apr. 5, 2018.

(51) Int. Cl.
*H04L 12/26* (2006.01)
*H04W 72/12* (2009.01)
*H04B 7/024* (2017.01)

(52) U.S. Cl.
CPC ............ *H04W 72/12* (2013.01); *H04B 7/024* (2013.01)

(58) Field of Classification Search
USPC .... 370/229, 230, 230.1, 236, 252, 328, 329, 370/330, 332
See application file for complete search history.

(56) References Cited

U.S. PATENT DOCUMENTS 9,706,550 B1 * 7/2017 Zhou ................. H04W 72/0446
2013/0039203 A1 * 2/2013 Fong ...................... H04B 7/024
370/252

(Continued)

FOREIGN PATENT DOCUMENTS

CN      101026577 A      8/2007
CN      102158973 A      8/2011
(Continued)

OTHER PUBLICATIONS

Huawei Hisilicon: "Detailed Views on NR UE Feature List," 3GPP Draft; R1-1800845, 3rd Generation Partnership Project (3GPP), Mobile Competence Centre; 650, Route Des Lucioiles; F-06921 Sophia-Antipolis Cedex; France, vol. RAN WG1, No. Vancouver, Canada; Jan. 22-Jan. 26, 2018,Jan. 13, 2018, XP051385117, 24 pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] p. 17.

(Continued)

*Primary Examiner* — Nguyen H Ngo
(74) *Attorney, Agent, or Firm* — MG-IP

(57) ABSTRACT

In an embodiment, a transmission reception point (TRP) apparatus of a Coordinated Multipoint (CoMP) network, determines a periodicity of periodic traffic between the TRP apparatus and a user equipment (UE), and schedules a Channel State Information (CSI) process in advance of a traffic window for a next instance of the periodic traffic in accordance with the determined periodicity. In another embodiment, the UE of the CoMP network performs the CSI process in advance of the traffic window for the next instance of periodic traffic between the UE and the TRP apparatus, the CSI process being scheduled in accordance with the determined periodicity of the periodic traffic.

11 Claims, 14 Drawing Sheets

(56) References Cited

U.S. PATENT DOCUMENTS

| | | | |
|---|---|---|---|
| 2014/0105164 A1* | 4/2014 | Moulsley | H04W 72/1289 370/329 |
| 2015/0003311 A1* | 1/2015 | Feuersaenger | H04L 27/2602 370/311 |
| 2015/0003553 A1* | 1/2015 | Nammi | H04B 7/0456 375/267 |
| 2016/0249337 A1* | 8/2016 | Liang | H04W 72/042 |
| 2016/0262178 A1* | 9/2016 | Vangala | H04W 72/14 |
| 2017/0026942 A1* | 1/2017 | Vajapeyam | H04W 4/70 |
| 2017/0164226 A1* | 6/2017 | Wei | H04B 7/0478 |
| 2018/0092122 A1 | 3/2018 | Babaei et al. | |
| 2018/0124725 A1* | 5/2018 | Ghanbarinejad | H04B 7/088 |
| 2019/0274032 A1* | 9/2019 | Chatterjee | H04W 72/0466 |
| 2019/0296817 A1* | 9/2019 | Wu | H04L 5/0055 |
| 2019/0313375 A1* | 10/2019 | Loehr | H04W 72/04 |
| 2019/0313399 A1* | 10/2019 | Cheng | H04L 1/0027 |
| 2020/0259528 A1* | 8/2020 | Zhang | H04B 7/0626 |

FOREIGN PATENT DOCUMENTS

| | | |
|---|---|---|
| CN | 102412941 A | 4/2012 |
| CN | 102754457 A | 10/2012 |
| CN | 104812071 A | 7/2015 |
| WO | 2017054873 A1 | 4/2017 |
| WO | 2017096524 A1 | 6/2017 |
| WO | 2017135881 A1 | 8/2017 |

OTHER PUBLICATIONS

International Search Report and Written Opinion—PCT/US2019/021395—ISA/EPO—May 22, 2019.

"3rd Generation Partnership Project; Technical Specification Group Radio Access Network; NR; Physical Layer Procedures for Data (Release 15)", 3GPP TS 38.214 V15.0.0, Dec. 2017, pp. 27-28, Section 5.2.1.5.

* cited by examiner

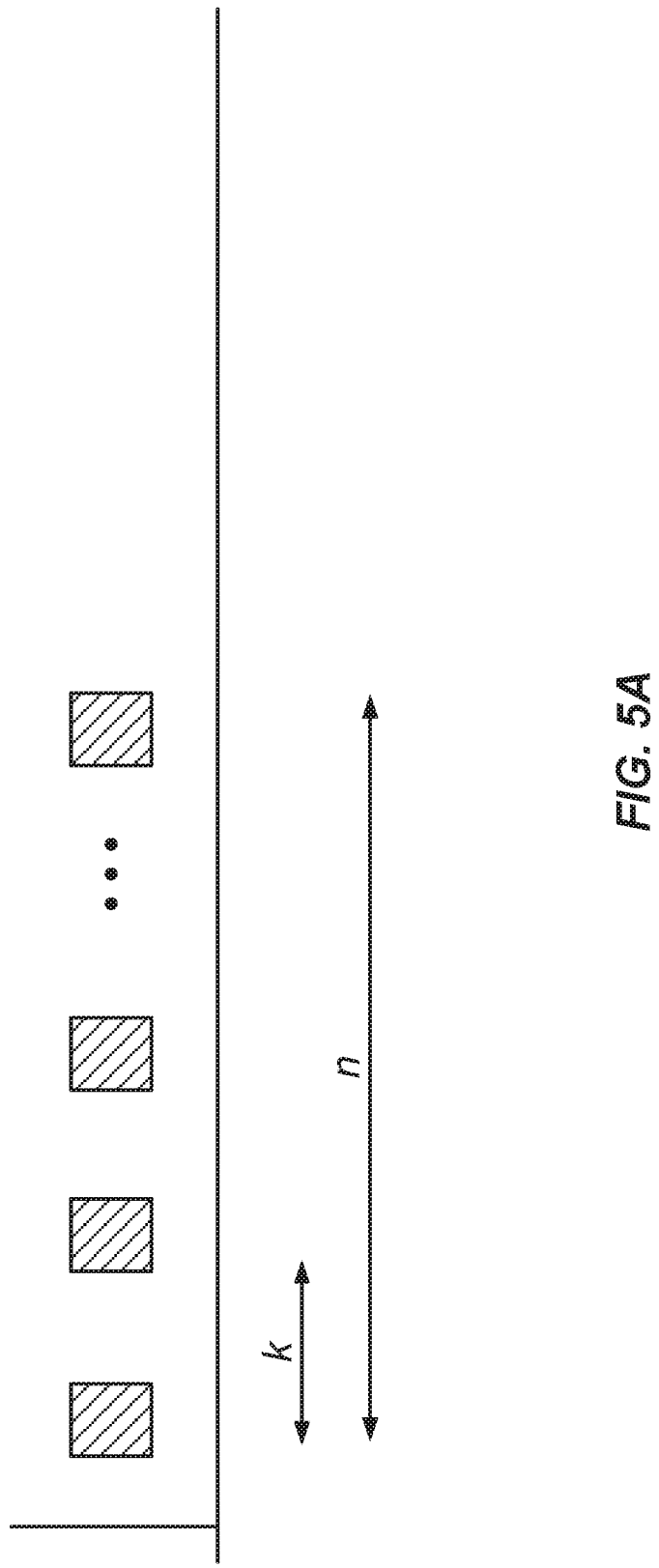

SCHEDULING CHANNEL STATE INFORMATION (CSI) PROCESSES IN ASSOCIATION WITH PERIODIC TRAFFIC IN A COMP NETWORK

CROSS-REFERENCE TO RELATED APPLICATIONS

The present application for patent claims the benefit of Provisional Patent Application No. 62/653,470 entitled "SCHEDULING CHANNEL STATE INFORMATION (CSI) PROCESSES IN ASSOCIATION WITH PERIODIC TRAFFIC IN A CoMP NETWORK" filed Apr. 5, 2018, assigned to the assignee hereof and hereby expressly incorporated herein by reference in its entirety.

INTRODUCTION

Aspects of this disclosure relate generally to telecommunications, and more particularly to operations on a Coordinated Multipoint (CoMP) network and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes, factories and office buildings, additional "small cell." typically low-power access points have recently begun to be deployed to supplement conventional macro networks. Small cell access points may also provide incremental capacity growth, richer user experience, and so on.

Additionally, wireless communication systems in factory automation have stringent reliability and latency requirements. Sensor, actuators, control commands and related signals typically need to communicate and work in coordinated fashion where delay or loss of signal could result in a catastrophic system failure. Accordingly, factory automation has additional implementation challenges when designing wireless communication systems.

SUMMARY

In an embodiment, a transmission reception point (TRP) apparatus of a Coordinated Multipoint (CoMP) network, determines a periodicity of periodic traffic between the TRP apparatus and a user equipment (UE), and schedules a Channel State Information (CSI) process in advance of a traffic window for a next instance of the periodic traffic in accordance with the determined periodicity.

In another embodiment, the UE of the CoMP network performs the CSI process in advance of the traffic window for the next instance of periodic traffic between the UE and the TRP apparatus, the CSI process being scheduled in accordance with the determined periodicity of the periodic traffic.

BRIEF DESCRIPTION OF THE DRAWINGS

The accompanying drawings are presented to aid in the description of various aspects of the disclosure and are provided solely for illustration of the aspects and not limitation thereof.

FIG. 5A illustrates a semi-persistent scheduling (SPS) resource grant in LTE/NR in accordance with an embodiment of the disclosure.

DETAILED DESCRIPTION

Techniques for scheduling channel state information (CSI) processes in association with periodic traffic in a CoMP network are disclosed. As will be described in more detail below, a transmission reception point (TRP) determines a periodicity of periodic traffic between the TRP and a user equipment (UE), and schedules a CSI process at least in advance of a traffic window for a next instance of the periodic traffic in accordance with the determined periodicity. An optional 'intra-window' CSI process may also be scheduled.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
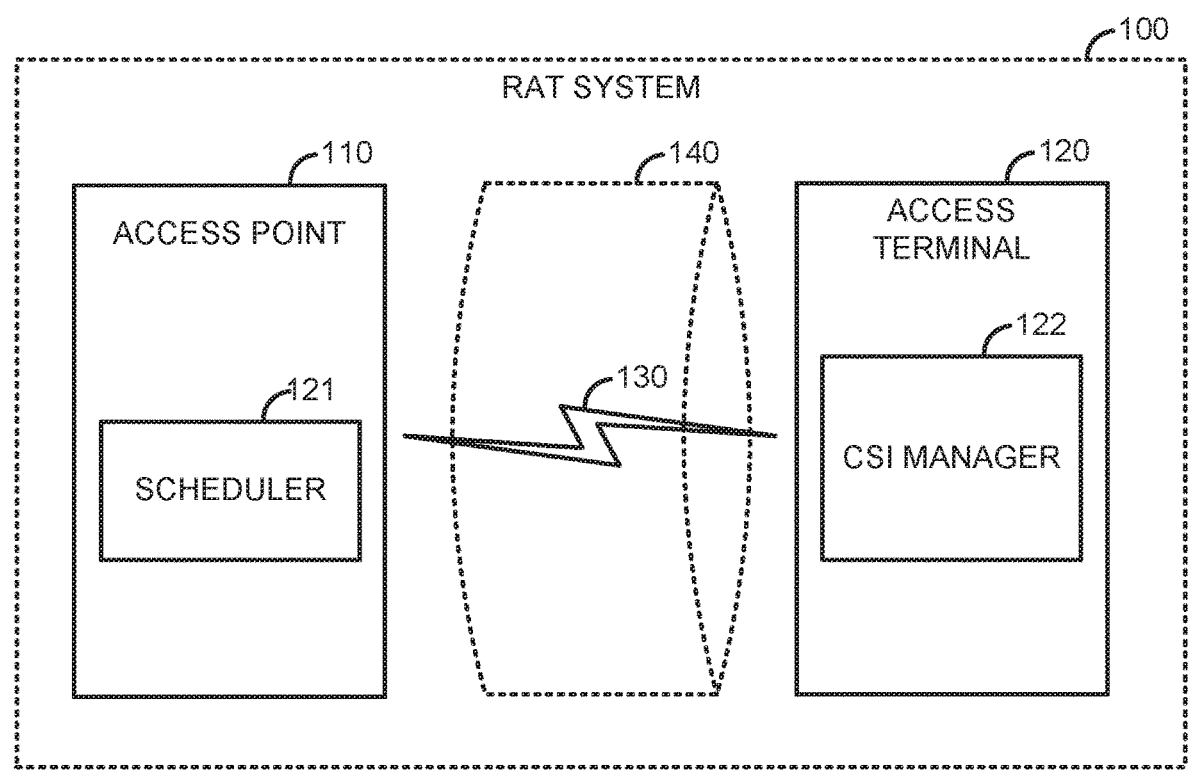
FIG. 1 is a system-level diagram illustrating an example wireless network environment.

FIG. 1 is a system-level diagram illustrating an example wireless network environment, shown by way of example as including a Radio Access Technology (RAT) system 100. The RAT system 100 may be composed of different wireless nodes generally capable of receiving and/or transmitting over a radio link, including information related to various types of communication (e.g., voice, data, multimedia services, associated control signaling, etc.). The RAT system 100 is shown as including an access point 110 and an access terminal 120 in communication with each other over a radio link 130. As an example, the access point 110 and the access terminal 120 of the RAT system 100 may communicate via the radio link 130 in accordance with 5G and/or Long Term Evolution (LTE) technology. It will be appreciated that the RAT system 100 may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, 5G New Radio (NR), NR with E-UTRA extensions, a NodeB, an evolved NodeB (eNB), etc. Such an access point may also correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, thereby leading to improved signaling, incremental capacity growth, richer user experience, and so on.

Returning to FIG. 1, the radio link 130 used by the RAT system 100 includes a communication medium 140, which may correspond to a licensed spectrum. A communication medium of this type may be composed of one or more frequency, time, and/or space communication resources (e.g., encompassing one or more channels across one or more carriers).

As will be described in more detail below, the access point 110 may include a CSI scheduler 121 and the access terminal 120 may include a CSI manager 122. The CSI scheduler 121 may be configured to schedule CSI processes as described below with respect to FIG. 6, and the CSI manager 122 may be configured to measure downlink signals from the access point 110 to generate a CSI at the access terminal 120 in accordance with the CSI scheduling as described below with respect to FIG. 7.

In a further embodiment, a Time Division Multiplexed (TDM) communication scheme may be implemented on the communication medium 140, whereby operation of the RAT system 100 is cycled over time between activated (ON) periods and deactivated (OFF) periods. A given activated period/deactivated period pair may constitute a traffic cycle.

Figure 2:
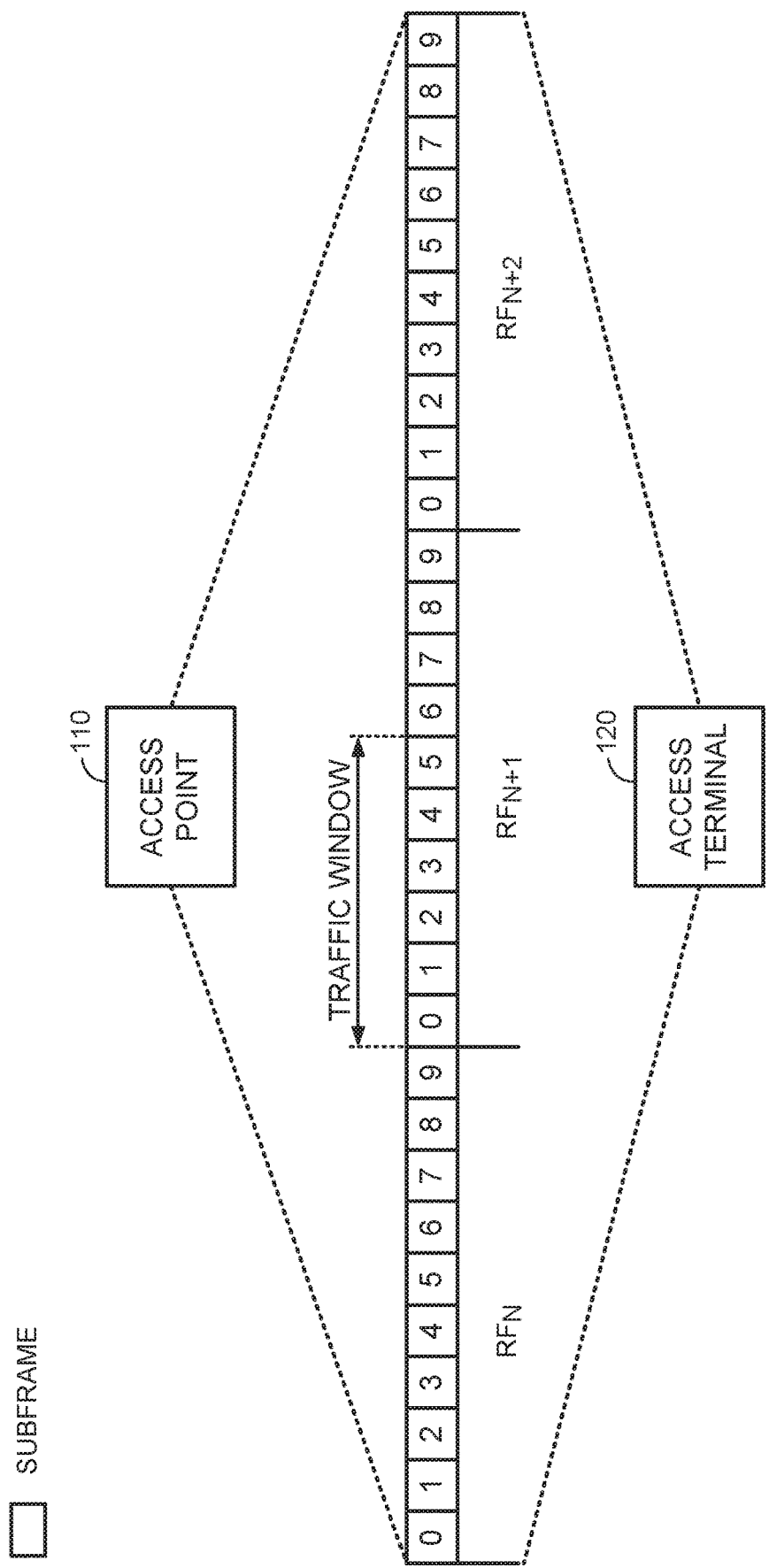
FIG. 2 illustrates an example frame structure according to an aspect of the disclosure.

FIG. 2 illustrates an example frame structure that may be implemented for the RAT system 100 on the communication medium 140 in accordance with an embodiment of the disclosure.

The illustrated frame structure includes a series of radio frames (RFs) that are numbered in accordance with a system frame number numerology ($RF_N$, $RF_{N+1}$, $RF_{N+2}$, etc.) and divided into respective subframes (SFs), which may also be numbered for reference (e.g., SF0, SF1, etc.). Each respective subframe may be further divided into slots (not shown in FIG. 2), and the slots may be further divided into symbol periods. As an example, the LTE frame structure includes system frames that are divided into 1024 numbered radio frames composed of 10 subframes each, which together constitute a system frame cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

In general, the example frame structure of FIG. 2 may be implemented as a Frequency Division Duplex (FDD) frame structure or a Time Division Duplex (TDD) frame structure. In an FDD frame structure, each subframe on a given frequency may be statically configured for uplink (UL) communication for transmitting uplink information from the access terminal 120 to the access point 110 or for downlink (DL) communication for transmitting downlink information from the access point 110 to the access terminal 120. In a TDD frame structure, each subframe may be variously operated at different times as a downlink (D), uplink (U), or special (S) subframe. Different arrangements of downlink, uplink, and special subframes may be referred to as different TDD configurations.

In some designs, the frame structure of FIG. 2 may be "fixed" in that the location of each subframe may be predetermined in relation to an absolute time, but may or may not be occupied by RAT signaling in any given instance. In other designs, however, the frame structure of FIG. 2 may be "floating" in that the location of each subframe may be dynamically determined.

As is further illustrated in FIG. 2, one or more subframes may be designated to include reference signaling for facilitating system operation. The reference signaling may include information relevant to timing synchronization, system acquisition, interference measurements (e.g., Radio Resource Measurements (RRM)/Radio Link Measurements (RLM)), tracking loops, gain reference (e.g., Automatic Gain Control (AGC)), paging, etc. As an example, the reference signaling may include a Primary Synchronization Signal (PSS) and a Secondary Synchronization Signal (SSS) for cell searching, a Cell-specific Reference Signal (CRS) for RRM, a Physical Broadcast Channel (PBCH) for conveying various access parameters, and so on. The reference signaling may be scheduled for transmission periodically (e.g., every 10 ms) in a designated subframe(s) of each radio frame (e.g., subframe SF0) or in a range of such subframes referred to as a traffic window. For LTE operating in a licensed spectrum, the reference signaling is used to monitor the quality of the radio link (e.g., radio link 130) and to trigger a Radio Link Failure (RLF) when operating conditions on the radio link deteriorate.

Figure 3:
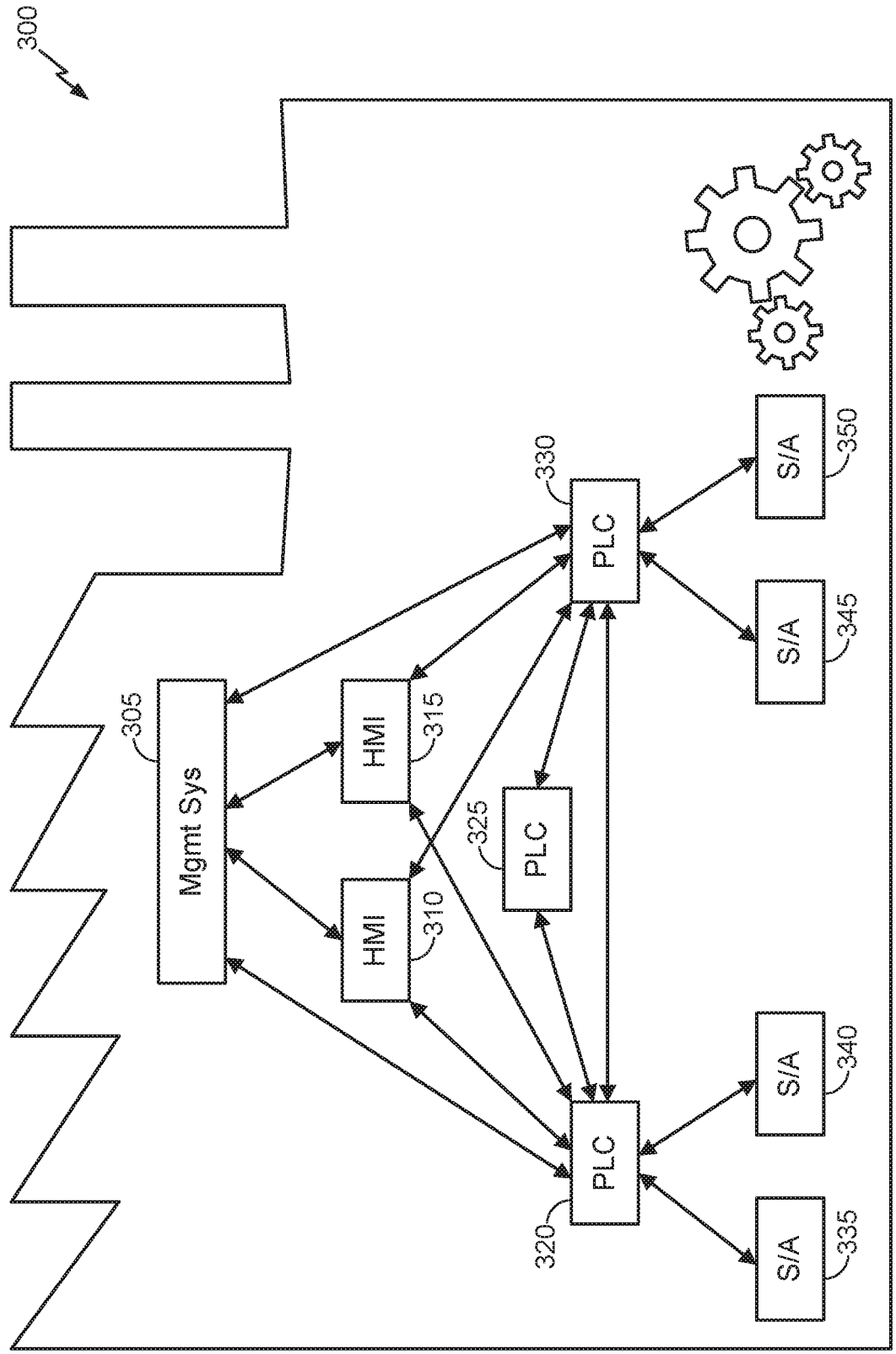
FIG. 3 illustrates a Coordinated Multipoint (CoMP) network in accordance with an embodiment of the disclosure.

FIG. 3 illustrates a Coordinated Multipoint (CoMP) network 300 in accordance with an embodiment of the disclosure. In particular, the CoMP network 300 of FIG. 3 represents an example of an industrial IoT network (e.g., for monitoring and/or controlling various devices or sensors deployed in a factory setting).

Referring to FIG. 3, the CoMP network 300 includes a management system 305, human machine interfaces (HMIs) 310-315, programmable logic controllers (PLCs) 320-330 and sensor/actuators (S/As) 335-350. In FIG. 3, the various interconnections (or arrows) between the various CoMP network components may correspond to wired or wireless communications interfaces.

Referring to FIG. 3, the management system 305 includes controller programming, manages software and security for the CoMP network 300, and performs long-term key performance indicator (KPI) monitoring. The HMIs 310-315 include user devices (e.g., tablet computers, panels, wearable computers, etc.). For example, the HMIs 310-315 may permit machine control by authorized personnel at the factory floor (e.g., Start/Stop certain machinery, change a mode of a particular machine from 'widget 1' to 'widget 2', etc.). The HMIs 310-315 may optionally provide an augmented reality (AR) user interface or a virtual reality (VR) user interface.

Referring to FIG. 3, the PLCs 320-330 may communicate with the S/As 335-350. For example, the PLCs 320-330 may include custom hardware and may issue commands (e.g., motion control) to the S/As 335-350, and may receive sensor inputs (e.g., position data, etc.) from the S/As 335-350 in real-time. The various PLCs 320-330 may also coordinate with each other with respect to S/A control. In an example, the S/As 335-350 may include rotary motors, linear servomotors and/or position sensors.

Table 1 (below) depicts example PLC communication parameters for the CoMP network 300:

TABLE 1

Example PLC Communication Parameters

| Parameter | PLC to S/A | Inter PLC | PLC to Higher Entities |
|---|---|---|---|
| RTT | 0.5 to 10 ms | 4-10 ms | Similar to enhanced mobile broadband (eMBB) use cases (file download, HTML) and also extends to AR/VR |
| Packet Error Rate (PER) Target | 10e−6 | 10e−6 | |
| Packet Size | 40-256 bytes | 1k bytes | |
| Communication Range (cell size) | Maximum: 100 m Typical: 10-15 m | Typical: 100 m | |

In a particular example, traffic between the PLCs 320-320 and the S/As 335-350 may include mission-critical traffic and non-critical traffic. Most mission-critical traffic occurs periodically, whereas non-critical traffic generally occurs aperiodically. In a particular factory example, a network of distributed PLCs may define between 100-1000 cells (e.g., scalable based on a size of the factory) with a cell size of 10×10×3 m, with each cell supporting 20-50 nodes (e.g., S/As, HMIs, etc.).

Referring to FIG. 3, the CoMP network 300 may correspond to an example implementation of the RAT system 100 of FIG. 1, whereby the S/As 335-350 and HMIS 310-315 are example implementations of the access terminal 120, and the PLCs 320-330 are example implementations of the access point 110 of the RAT system 100 of FIG. 1.

Figure 4A:
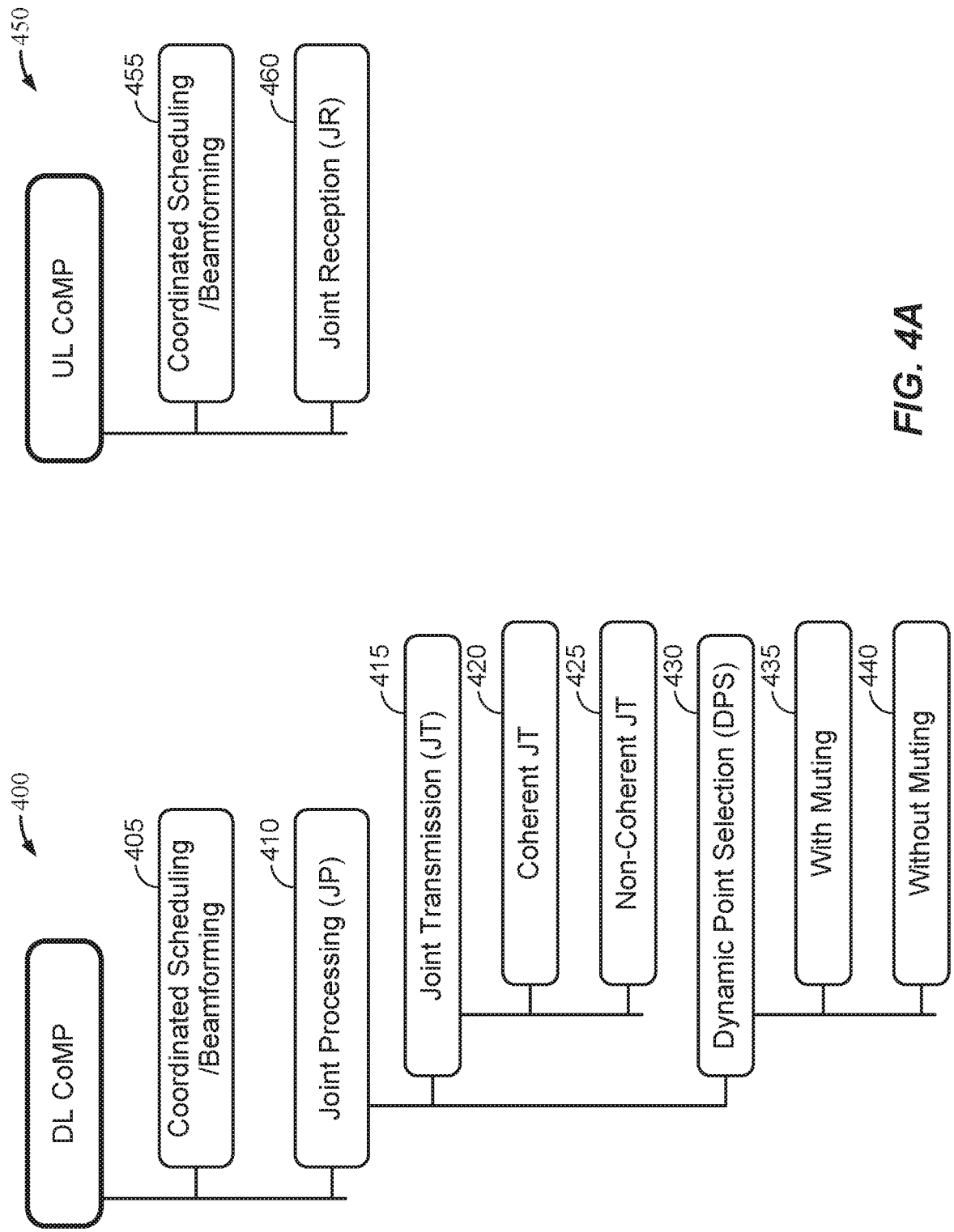
FIG. 4A illustrates downlink CoMP categories and uplink CoMP categories in accordance with an embodiment of the disclosure.

FIG. 4A illustrates downlink CoMP categories 400 and uplink CoMP categories 450 in accordance with an embodiment of the disclosure.

Referring to FIG. 4A, the downlink CoMP categories 400 include Coordinated Scheduling/Coordinated Beamforming (CS/CB) 405 and Joint Processing (JP) 410. The category of JP 410 includes sub-categories of Joint Transmission (JT) 415 and Dynamic Point Selection (DPS) 430. The sub-category of JT 415 includes further sub-categories Coherent JT 420 and Non-Coherent JT 425. The sub-category of DPS 430 includes further sub-categories of With Muting 435 and Without Muting 440. The uplink CoMP categories 450 include CS/CB 455 and Joint Reception (JR) 460.

With respect to CS/CB 405 and CS/CB 455, multiple transmission/reception points (TRPs) share Channel State Information (CSI) (e.g., the CSI may indicate a channel quality based on a measured CSI Reference Signal (CSI-RS) from a particular TRP) for a plurality of UEs, but otherwise do not coordinate their communications with particular UEs. Accordingly, a data packet to be transmitted to a specific UE is available at only one TRP. By contrast, with respect to JT 415, multiple TRPs transmit the same data to the same UE(s) with appropriate beamforming weights. DPS 430 is a specialized form of JT 415, whereby transmission of beamformed data for a given UE is performed at a single TRP at each time instance.

Figure 4B:
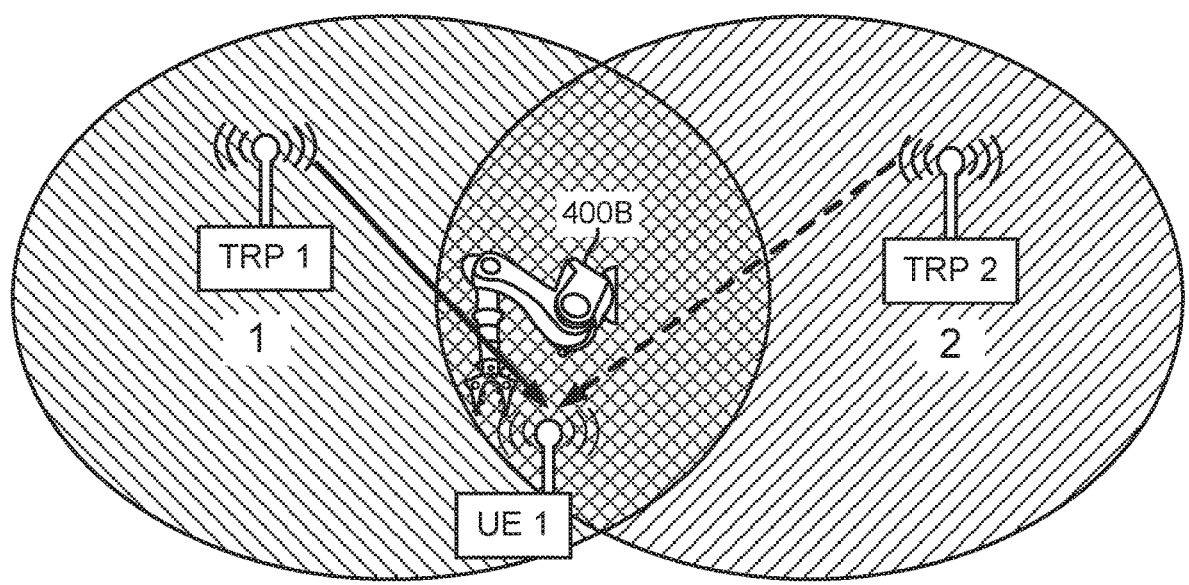
FIG. 4B illustrates multiple transmission reception points (TRPs) serving a user equipment (UE) in accordance with an embodiment of the disclosure.

Conventional CoMP protocols generally seek to improve ergodic (or average) capacity throughout the CoMP network 300. In particular, a primary objective for the CoMP network 300 is outage capacity (e.g., maintaining capacity with high reliability in the presence of fading, shadowing, etc.). One mechanism for improving outage capacity is through spatial diversity (e.g., coordinating transmissions from multiple TRPs or gNBs, at the scale of shadowing), which involves selecting multiple TRPs to serve a particular UE, as shown in FIG. 4B. In FIG. 4B, TRP 1 is a primary serving TRP of UE 1 (e.g., an S/A). However, in FIG. 4B, a robotic arm 400B blocks a line-of-sight (LoS) connection between TRP 1 and UE 1, whereas TRP 2 has an unobstructed LoS connection to UE 1. Hence, TRP 2 can operate as a secondary serving TRP (or cooperative TRP) for UE 1 in accordance with either multi-TRP communication schemes described above with respect to FIG. 4A.

While transmissions in the CoMP network 300 may generally occur opportunistically during periodic ON periods for the associated RAT of the CoMP network 300, as discussed above, certain mission-critical traffic between the PLCs 320-330 and the S/As 335-350 may reliably occur on a periodic basis. For example, the S/As 335-350 may periodically report mission-critical sensor feedback to the PLCs 320-330, and the PLCs 320-330 may periodically transmit mission-critical control data to the S/As 335-350.

FIG. 5A illustrates a semi-persistent scheduling (SPS) resource grant in LTE/NR in accordance with an embodiment of the disclosure. In FIG. 5A, a resource block is allocated to uplink and/or downlink traffic at a periodic interval that comprises k subframes is defined for a specified duration of n total subframes.

Figure 5B:
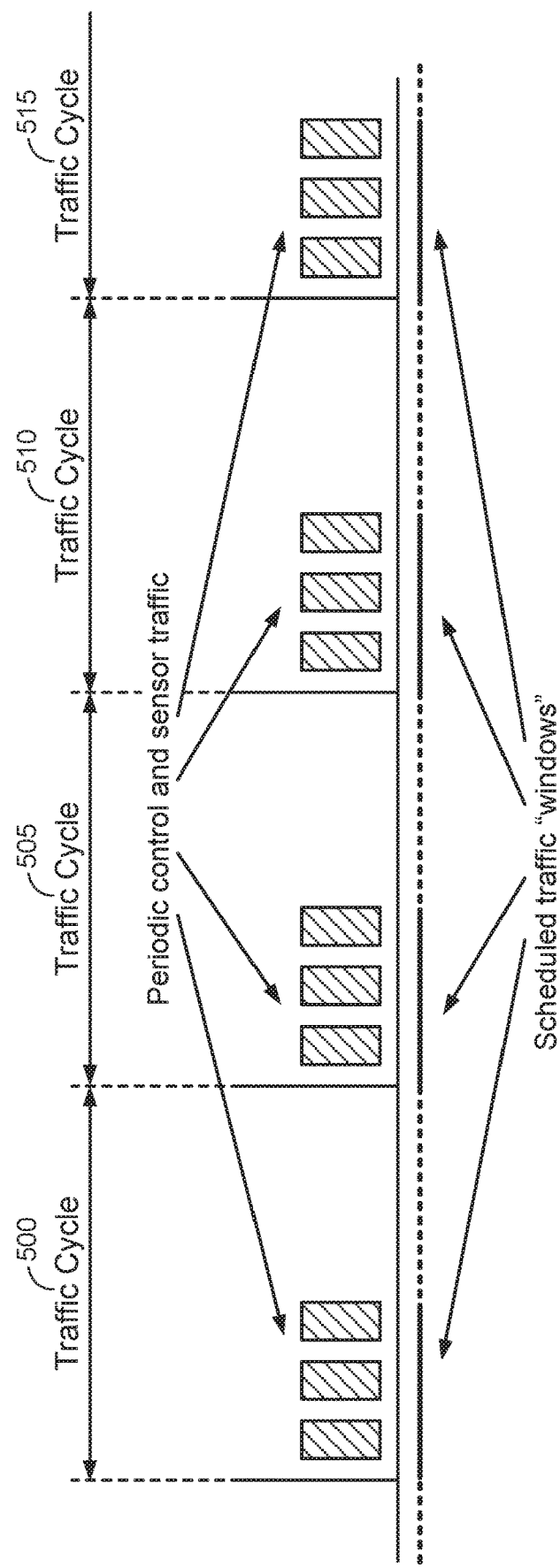
FIG. 5B illustrates an example of periodic control and sensor traffic of a CoMP network in accordance with an embodiment of the disclosure.

FIG. 5B illustrates an example of periodic control and sensor traffic of a CoMP network in accordance with an embodiment of the disclosure. In particular, a series of periodic ON/OFF traffic cycles 500, 505, 510 and 515 (e.g., radio frames) are shown. Each ON portion of each traffic cycle includes resources allocated to the periodic control and sensor traffic within scheduled traffic windows. In an example, the scheduled traffic windows of the periodic control and sensor traffic may correspond to resource blocks that are allocated in accordance with SPS.

Figure 6:
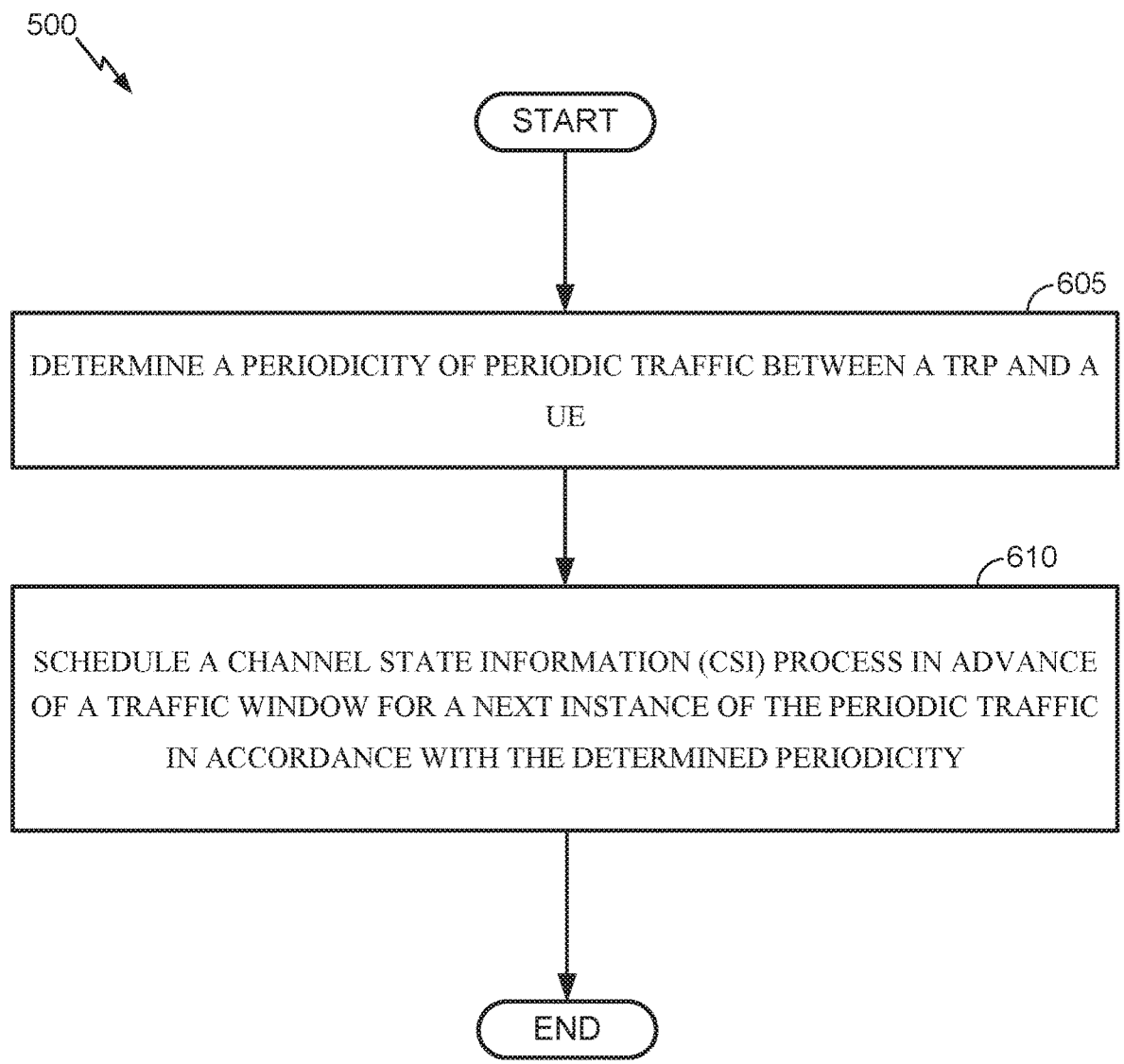
FIG. 6 illustrates a channel state information (CSI) scheduling procedure in accordance with an embodiment of the disclosure.

FIG. 6 illustrates a CSI scheduling procedure 600 in accordance with an embodiment of the disclosure. In an example, the CSI scheduling procedure 600 of FIG. 6 is performed by a TRP, such as any of the PLCs 320-330 from FIG. 3 or the access point 110 of FIG. 1.

Referring to FIG. 6, at block 605, the TRP determines a periodicity of periodic traffic between the TRP and a UE. For example, the periodic traffic may correspond to mission-critical traffic that repeats at each traffic cycle as shown in FIG. 5B, in which case the periodicity of the periodic traffic is the length of a traffic cycle or radio frame.

Referring to FIG. 6, at block 610, the TRP schedules a CSI process in advance of a traffic window for a next instance of the periodic traffic in accordance with the determined periodicity. In an example, the CSI process may be scheduled far enough in advance of the traffic window so that the CSI process can be used by the TRP to establish a resource allocation for the next instance of the periodic traffic in the traffic window. In a further example, the CSI process may include the TRP transmitting a CSI-RS on a downlink resource, which is measured by the UE, after which the UE reports the CSI-RS measurement as a CSI back to the TRP. Further, the CSI process may be scheduled in resource blocks that directly precede the startpoint of the traffic window. If the traffic window starts at the beginning of the ON period, then the CSI process may be scheduled to occur at the end of the preceding OFF period.

In an example, the CSI process may be scheduled in accordance with a semi-persistent scheduling (SPS) protocol such that the CSI process is performed in association with multiple instances of the periodic traffic (e.g., in the same resource blocks of each traffic cycle or radio frame). In this case, the scheduling of the CSI process need not consume resource blocks in each traffic cycle, such that overhead associated with the scheduling of block 610 can be reduced or eliminated. More specifically, if multiple CSI processes are to be semi-persistently scheduled in the same traffic cycle, an enhanced SPS (eSPS) protocol may be used.

A discussion of various example eSPS protocols will now be provided. Consider a traffic cycle having I intervals, each having M slots. Thus, the overall traffic cycle period in terms of slots is K=M*I slots. The TRP (e.g., gNB) specifies the UEs that are scheduled in each slot of each interval and the resources (RBs) allocated to them. Different links can be grouped based on the DL/UL requirement, with part of M slots may be used for DL and part for UL (e.g., some intervals could be DL only and some UL only). Further, some slots may be left unspecified—scheduled explicitly later, e.g., for re-transmissions on need basis.

A specific UE may be active in one or more of M slots (e.g., some may be DL and some UL). A set of active resources (slots and RBs) in each interval of the traffic cycle stays the same for the UE until modified. In other words, from a UE's perspective, cSPS consists of a persistent schedule of period M*I slots, with the indication of the DL/UL resources or no activity in each of the slots, as shown in Table 2:

TABLE 2

| Slot | UE 1 | UE 2 | ... |
|---|---|---|---|
| 1 | DL, RB1-3 | OFF | ... |
| 2 | OFF | DL, RB4-6 | ... |
| 3 | UL, RB4-6 | UL, RB1-3 | ... |
| ... | ... | ... | ... |
| M * I | OFF | OFF | ... |

In general, when the TRP (e.g., gNB) conveys the eSPS schedule to UE(s), it can aggregate scheduling over multiple intervals if the schedule remains the same over them. The traditional LTE SPS is a special case with the cycle having a single interval (e.g., corresponding to the specified periodicity of K slots).

Another example is traffic with ON-OFF duty cycle, which is typical in certain factory automation (FA) implementations. The overall cycle period is T1+T2 slots, with the TRP-S/A communication is ON for T1 slots and the Controller-S/A communication is OFF for next T2 slots. During the ON time, the TRP communicates with different S/As in different resources (e.g., slots and their RBs). The TRP-S/A exchange can further be multi-round, i.e., periodic, during on time, with period of L slots. This corresponds to eSPS with Interval M=L slots
First T1/L intervals consist of ON-slots
Remaining T2/L intervals consist of OFF-slots
Furthermore, with the schedule aggregation in eSPS:
Schedule over multi-round ON-slots can be aggregated
Schedule over OFF-slots can be aggregated
This results in a compact schedule description, as shown in Table 3:

TABLE 3

| Slot | UE 1 | UE 2 | ... |
|---|---|---|---|
| 1 | DL, RB1-3 | OFF | ... |
| 2 | OFF | DL, RB4-6 | ... |
| ... | ... | ... | ... |
| L | UL, RB4-6 | UL, RB1-3 | ... |
| Repeat Slots 1-L T1/L times | | | |
| T1 + 1 to T1 + T2 | OFF | OFF | ... |

In a further embodiment, the periodic scheduling protocol (e.g., SPS, eSPS, etc.) used to schedule the CSI process may be the same or different from the periodic scheduling protocol (e.g., SPS, eSPS, etc.) used to schedule the periodic data traffic. To put it another way, the periodic scheduling protocol used to schedule the CSI process may correspond to any type of periodic scheduling protocol that uses an ON-OFF-duty cycle, and need not be piggybacked onto the data traffic's scheduling. Moreover, even if the same periodic scheduling protocol is used for both the CSI process scheduling and the periodic data traffic scheduling, the respective schedules can be established independently from each other in various embodiments.

Returning to FIG. 6, in a further example, at block 610, the TRP may further schedule a supplemental CSI process during the traffic window for the next instance of the periodic traffic. For example, if the traffic window is longer than a threshold duration, the supplemental CSI process may be required. In a particular example, with respect to a System Frame Number (SFN) with coherent transmission. CSI processes (e.g., CSI-RS in at least one downlink RB followed by UE CSI reporting in at least one uplink RB, as shown in Tables 2-3 in slots 1 and L for UE 1 or slots 2 and L for UE 2) may need to be scheduled for faster feedback, in which case the 'intra-window' supplemental CSI process can be used to accommodate the higher feedback requirement.

Figure 7:
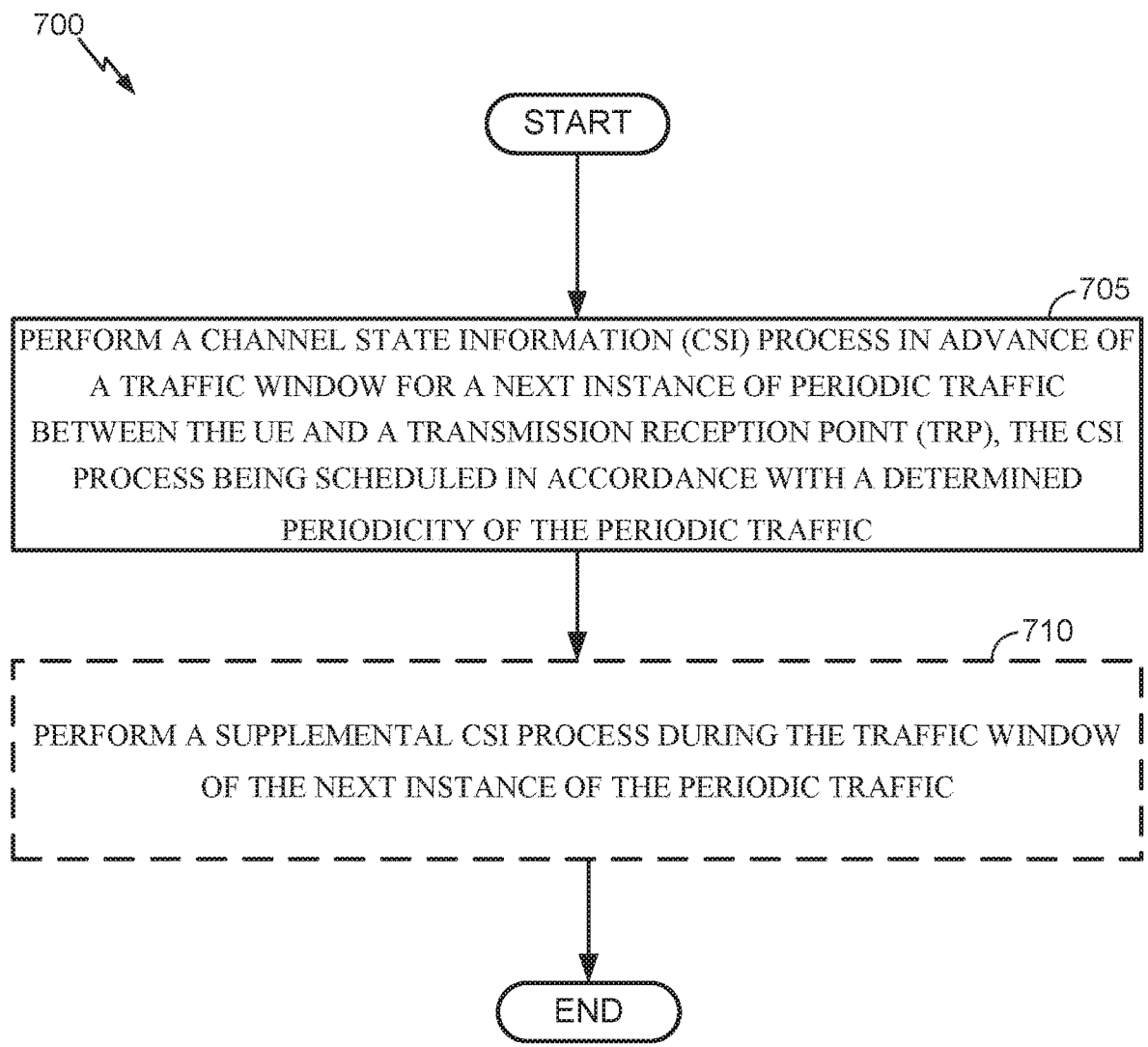
FIG. 7 illustrates a CSI procedure in accordance with an embodiment of the disclosure.

FIG. 7 illustrates a CSI procedure 700 in accordance with an embodiment of the disclosure. In an example, the CSI procedure 700 of FIG. 7 is performed by a UE, such as any of the S/As 335-350 from FIG. 3 or the access terminal 120 of FIG. 1.

Referring to FIG. 7, at block 705, the UE performs a CSI process in advance of a traffic window for a next instance of periodic traffic between the UE and a TRP, the CSI process being scheduled in accordance with a determined periodicity of the periodic traffic. In an example, the CSI process may be performed far enough in advance of the traffic window so that the CSI process can be used by the TRP to establish a resource allocation for the next instance of the periodic traffic in the traffic window. In a further example, the CSI process performed by the UE at block 705 may be scheduled by the TRP as described above with respect to block 610 of FIG. 6. As noted above, the CSI process may include the TRP transmitting a CSI-RS on a downlink resource, which is measured by the UE, after which the UE reports the CSI-RS measurement as a CSI back to the TRP. At block 710, the UE optionally performs a supplemental CSI process during the traffic window of the next instance of the periodic traffic.

In an example, the CSI process and/or the supplemental CSI process may be scheduled in accordance with a SPS or eSPS protocol such that the CSI process and/or the supplemental CSI process is performed in association with multiple instances the periodic traffic (e.g., in the same resource blocks of each traffic cycle). In this case, the scheduling of the CSI process need not consume resource blocks in each traffic cycle, such that overhead associated with scheduling of the CSI processes performed at blocks 705-710 can be reduced or eliminated.

Figure 8A:
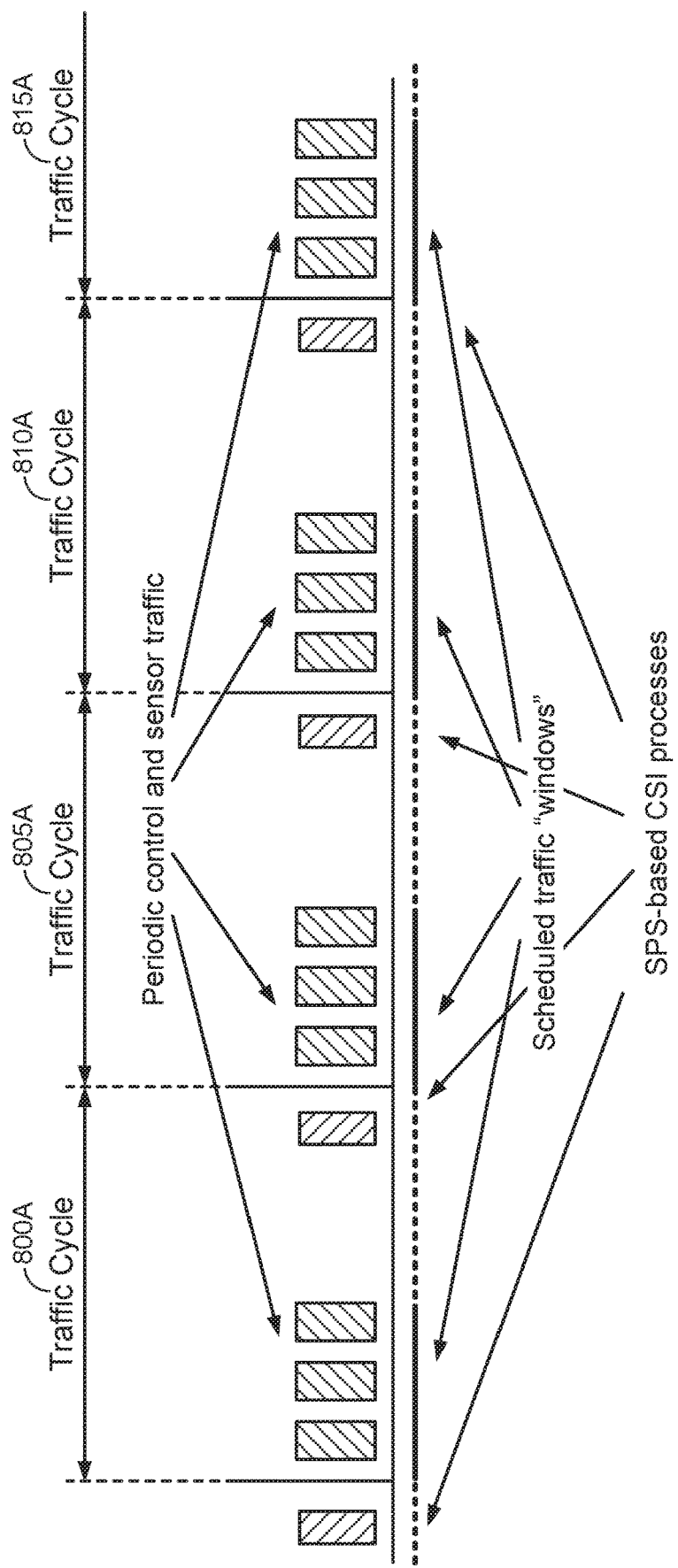
FIG. 8A illustrates an example of periodic control and sensor traffic of a CoMP network in accordance with another embodiment of the disclosure.

FIG. 8A illustrates an example of periodic control and sensor traffic of a CoMP network in accordance with another embodiment of the disclosure. In particular, a series of periodic traffic cycles 800A, 805A, 810A and 815A (e.g., radio frames) are shown. Each ON portion of each traffic cycle includes resources allocated to the periodic control and sensor traffic within scheduled traffic windows. The periodic control and sensor traffic in FIG. 8A is similar to FIG. 5B, except that periodic SPS-based CSI processes are scheduled in advance of the traffic window containing the periodic control and sensor traffic in each traffic cycle in accordance with the processes of FIGS. 6-7.

Figure 8B:
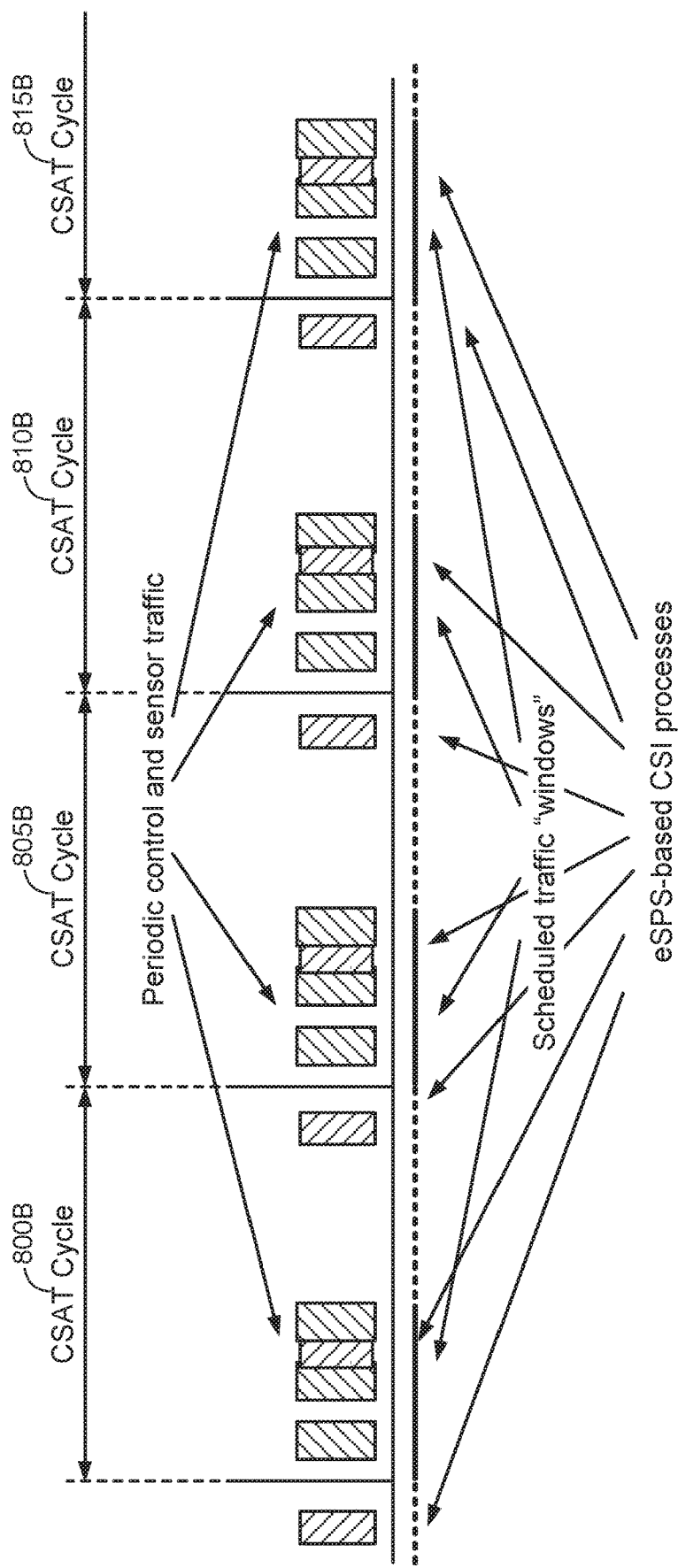
FIG. 8B illustrates an example of periodic control and sensor traffic of a CoMP network in accordance with another embodiment of the disclosure.

FIG. 8B illustrates an example of periodic control and sensor traffic of a CoMP network in accordance with another embodiment of the disclosure. In particular, a series of periodic traffic cycles 800B, 805B, 810B and 815B (e.g., radio frames) are shown. Each ON portion of each traffic cycle includes resources allocated to the periodic control and sensor traffic within scheduled traffic windows. The periodic control and sensor traffic in FIG. 8B is similar to FIG. 8A, except that supplemental periodic CSI processes are scheduled during the traffic windows in addition to the CSI processes performed in advance of the traffic windows as in FIG. 8A. As noted above, for multiple CSI processes to be persistently scheduled in the same traffic cycle, an eSPS-based scheduling protocol may be used.

Figure 9:
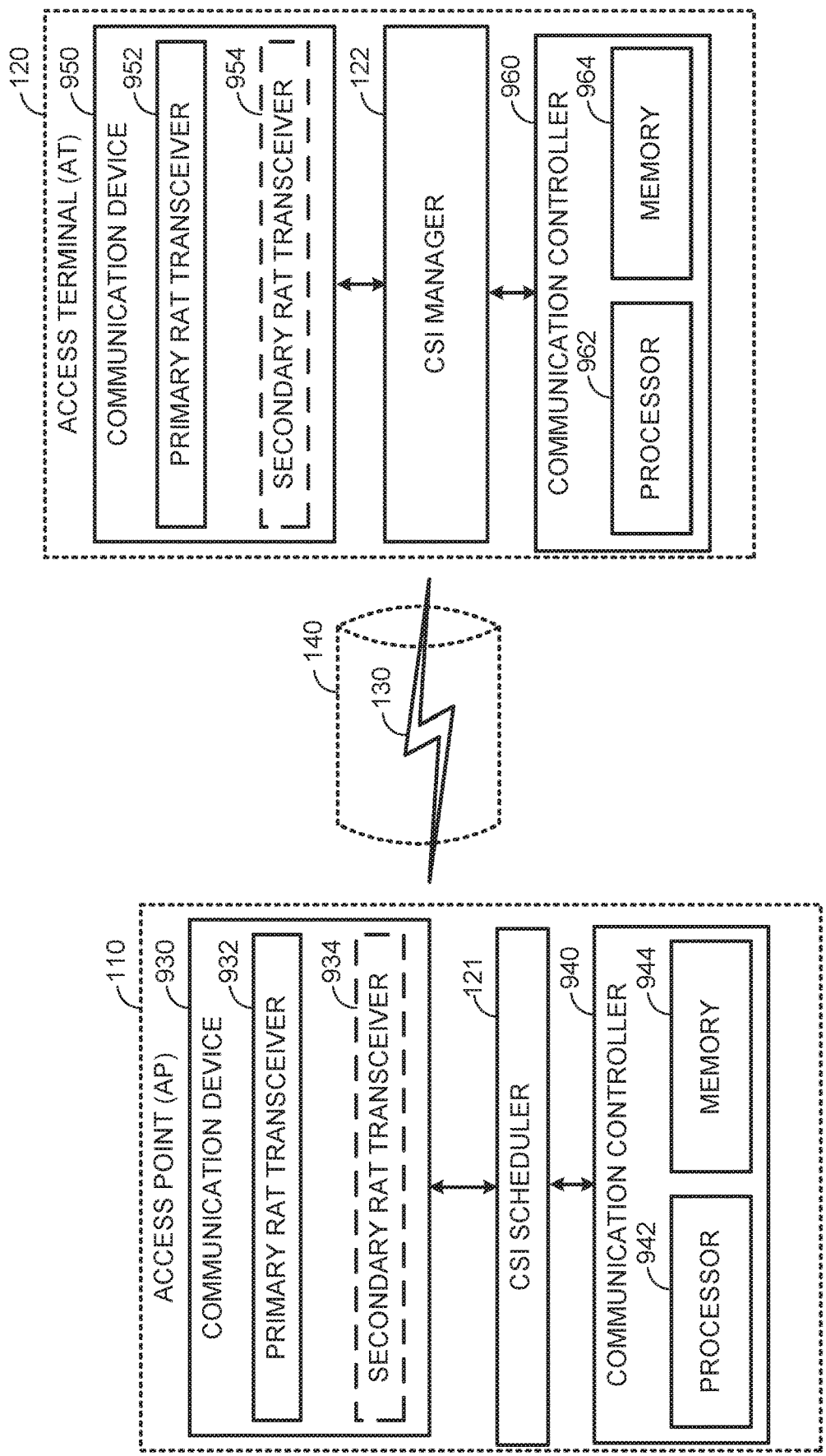
FIG. 9 is a device-level diagram illustrating example components of an access point and an access terminal in accordance with another embodiment of the disclosure.

FIG. 9 is a device-level diagram illustrating example components of the access point 110 and the access terminal 120 of the RAT system 100 in more detail. As shown, the access point 110 and the access terminal 120 may each generally include a wireless communication device (represented by the communication devices 930 and 950) for communicating with other wireless nodes via at least one designated RAT. The communication devices 930 and 950 may be variously configured for transmitting and encoding signals, and, conversely, for receiving and decoding signals in accordance with the designated RAT (e.g., messages, indications, information, pilots, and so on).

The communication devices 930 and 950 may include, for example, one or more transceivers, such as respective primary RAT transceivers 932 and 952 (e.g., LTE), and, in some designs, (optional) co-located secondary RAT transceivers 934 and 954 (e.g., WiFi or WLAN), respectively. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 940 and 960) for controlling operation of their respective communication devices 930 and 950 (e.g., directing, modifying, enabling, disabling, etc.). The communication controllers 940 and 960 may include one or more processors 942 and 962, and one or more memories 944 and 964 coupled to the processors 942 and 962, respectively. The memories 944 and 964 may be configured to store data, instructions, or a combination thereof, either as on-board cache memory, as separate components, a combination, etc. The processors 942 and 962 and the memories 944 and 964 may be standalone communication components or may be part of the respective host system functionality of the access point 110 and the access terminal 120.

It will be appreciated that the CSI scheduler 121 may be implemented in different ways. In some designs, some or all of the functionality associated therewith may be implemented by or otherwise at the direction of at least one processor (e.g., one or more of the processors 942), at least one memory (e.g., one or more of the memories 944), at least one transceiver (e.g., one or more of the transceivers 932 and 934), or a combination thereof. In other designs, some or all of the functionality associated therewith may be implemented as a series of interrelated functional modules.

It will be appreciated that the CSI manager 122 may be implemented in different ways. In some designs, some or all of the functionality associated therewith may be implemented by or otherwise at the direction of at least one processor (e.g., one or more of the processors 962), at least one memory (e.g., one or more of the memories 964), at least one transceiver (e.g., one or more of the transceivers 952 and 954), or a combination thereof. In other designs, some or all of the functionality associated therewith may be implemented as a series of interrelated functional modules.

Accordingly, it will be appreciated that the components in FIG. 9 may be used to perform operations described above with respect to FIGS. 1-8B.

Figure 10:
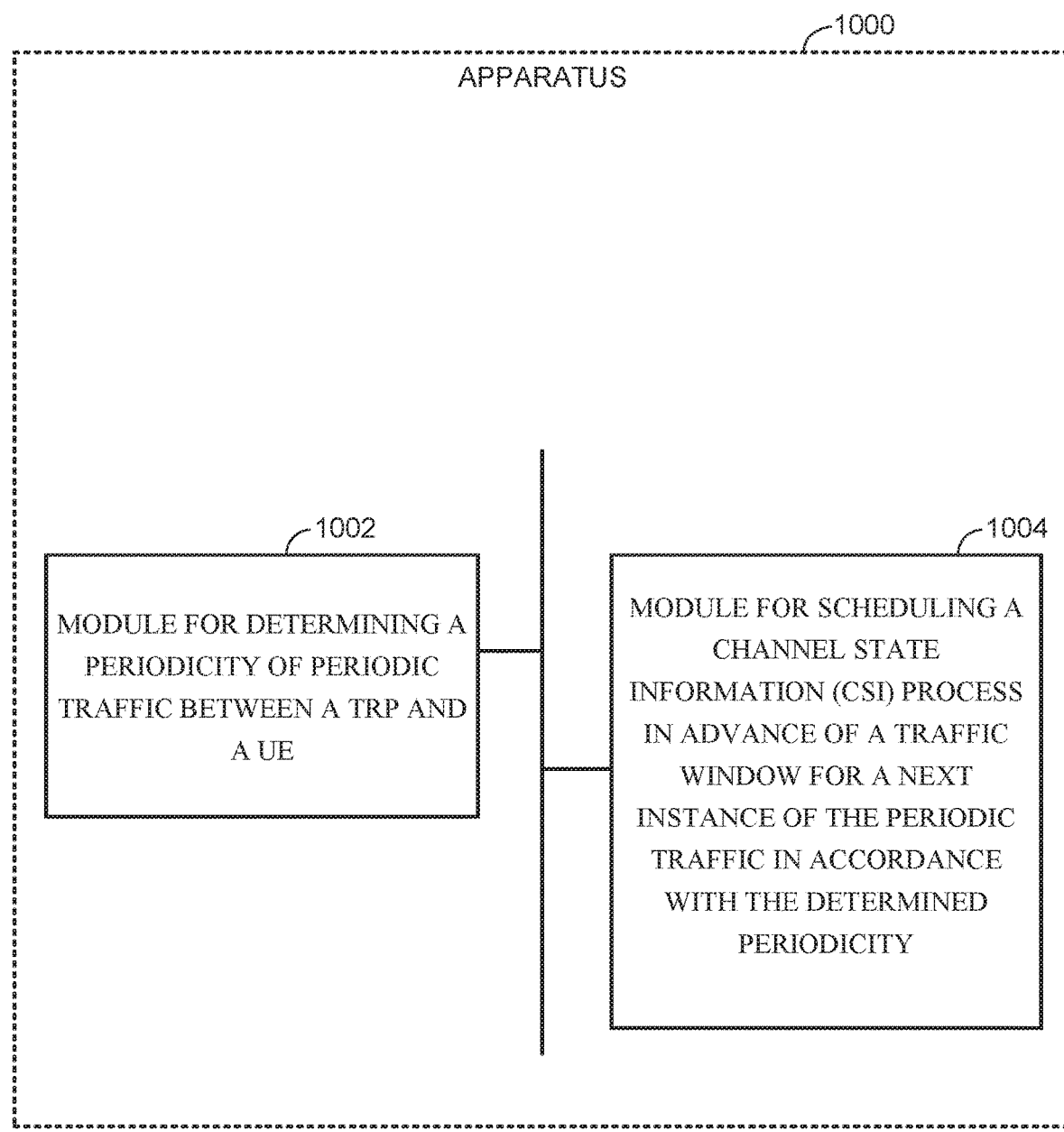
FIG. 10 illustrates an example apparatus for implementing the CSI techniques discussed herein at a TRP represented as a series of interrelated functional modules in accordance with an embodiment of the disclosure.

FIG. 10 illustrates an example apparatus 1000 for implementing the CSI techniques discussed herein (e.g., with respect to FIG. 6) at a TRP represented as a series of interrelated functional modules in accordance with an embodiment of the disclosure. In the illustrated example, the apparatus 1000 includes a module for determining 1002, and a module for scheduling 1004.

The module for determining 1002 may be configured to determine a periodicity of periodic traffic between the TRP and a UE (e.g., block 605 of FIG. 6). The module for scheduling 1004 may be configured to schedule a CSI process in advance of a traffic window for a next instance of the periodic traffic in accordance with the determined periodicity (e.g., block 610 of FIG. 6). The module for scheduling 1004 may also schedule an optional 'intra-window' supplemental CSI process as noted above with respect to FIG. 6.

Figure 11:
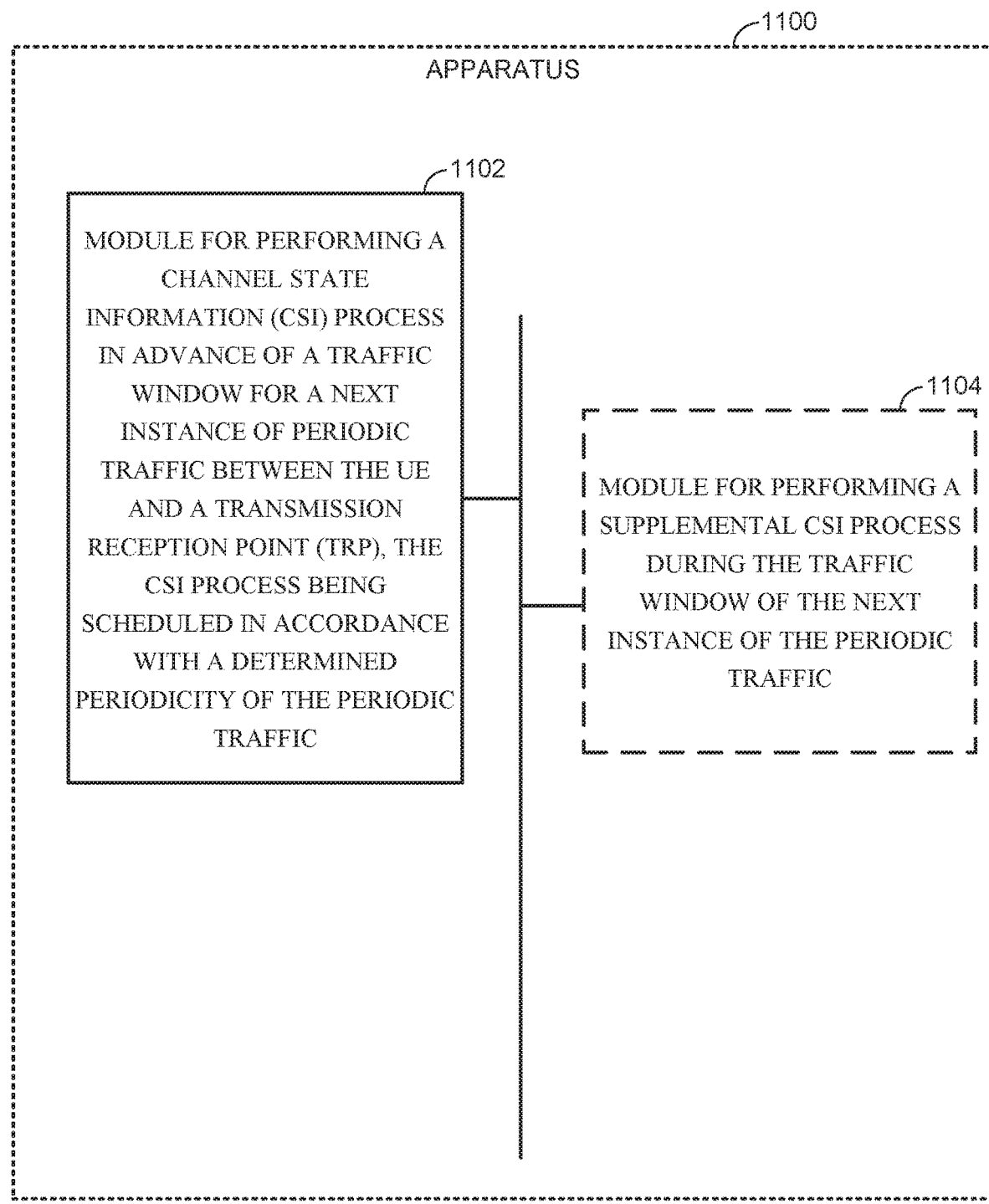
FIG. 11 illustrates an example apparatus for implementing the CSI techniques discussed herein at a UE represented as a series of interrelated functional modules in accordance with an embodiment of the disclosure.

FIG. 11 illustrates an example apparatus 1100 for implementing the CSI techniques discussed herein (e.g., with respect to FIG. 7) at a UE represented as a series of interrelated functional modules in accordance with an embodiment of the disclosure. In the illustrated example, the apparatus 1100 includes a module for determining 1102, and an optional module for performing 1104.

The module for performing 1102 may be configured to perform a CSI process in advance of a traffic window for a next instance of periodic traffic between the UE and a TRP, the CSI process being scheduled in accordance with a determined periodicity of the periodic traffic (e.g., block 705 of FIG. 7). The optional module for performing 1104 may be configured to perform a supplemental CSI process during the traffic window of the next instance of the periodic traffic. (e.g., block 710 of FIG. 7).

The functionality of the modules of FIGS. 10-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10-11, as well as other components and functions described herein, may be implemented using any suitable means. Such means also may be implemented, at least in part, using corresponding structure as taught herein. For example, the components described above in conjunction with the "module for" components of FIGS. 10-11 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well as in sequences of actions that may be represented by pseudocode. For example, the components and functions represented by FIGS. 10-11 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating a user equipment (UE) of a Coordinated Multipoint (CoMP) network, comprising:
    performing a Channel State Information (CSI) process in advance of a traffic window for a next instance of periodic traffic of a first type that is scheduled between the UE and a transmission reception point (TRP) apparatus, the periodic traffic of the first type being separate from aperiodic traffic of a second type between the UE and the TRP apparatus, the CSI process being scheduled in accordance with a determined periodicity of the periodic traffic of the first type; and
    if the traffic window is longer than a threshold duration, performing a supplemental CSI process during the traffic window of the next instance of the periodic traffic of the first type.

2. The method of claim 1, wherein the CSI process is scheduled in accordance with a semi-persistent scheduling (SPS) protocol to reduce or eliminate overhead associated with repeated executions of the CSI process in association with multiple instances of the periodic traffic of the first type.

3. The method of claim 1, wherein the CSI process and the supplemental CSI process are scheduled in accordance with an enhanced semi-persistent scheduling (eSPS) protocol to reduce or eliminate overhead associated with repeated executions of the CSI process and the supplemental CSI process in association with multiple instances of the periodic traffic of the first type.

4. The method of claim 3, wherein the CSI process and the supplemental CSI process are scheduled in a set of resources of each of a plurality of periodic traffic cycles in accordance with the eSPS protocol.

5. The method of claim 4, wherein the set of resources is the same in each of the plurality of periodic traffic cycles.

6. The method of claim 4, wherein the set of resources includes resource blocks in different slots of each of the plurality of periodic traffic cycles.

7. The method of claim 6, wherein, for each of the CSI process and the supplemental CSI process in each of the plurality of periodic traffic cycles, the resource blocks include at least one downlink resource block followed by at least one uplink resource block.

8. A user equipment (UE) of a Coordinated Multipoint (CoMP) network, comprising:
    a transceiver; and
    at least one processor coupled to the transceiver and configured to:
        perform a Channel State Information (CSI) process in advance of a traffic window for a next instance of periodic traffic of a first type that is scheduled between the UE and a transmission reception point (TRP) apparatus, the periodic traffic of the first type being separate from aperiodic traffic of a second type between the UE and the TRP apparatus, the CSI process being scheduled in accordance with a determined periodicity of the periodic traffic of the first type; and
        if the traffic window is longer than a threshold duration, perform a supplemental CSI process during the traffic window of the next instance of the periodic traffic of the first type.

9. The UE of claim 8, wherein the CSI process is scheduled in accordance with a semi-persistent scheduling (SPS) protocol to reduce or eliminate overhead associated with repeated executions of the CSI process in association with multiple instances of the periodic traffic of the first type.

10. The UE of claim 8, wherein the CSI process and the supplemental CSI process are scheduled in accordance with an enhanced semi-persistent scheduling (eSPS) protocol to reduce or eliminate overhead associated with repeated executions of the CSI process and the supplemental CSI process in association with multiple instances of the periodic traffic of the first type.

11. The UE of claim 10, wherein the CSI process and the supplemental CSI process are scheduled in a set of resources of each of a plurality of periodic traffic cycles in accordance with the eSPS protocol.

* * * * *